D. W. WELLS.
LAWN SPRINKLER.
APPLICATION FILED NOV. 5, 1907.
913,791.
Patented Mar. 2, 1909.
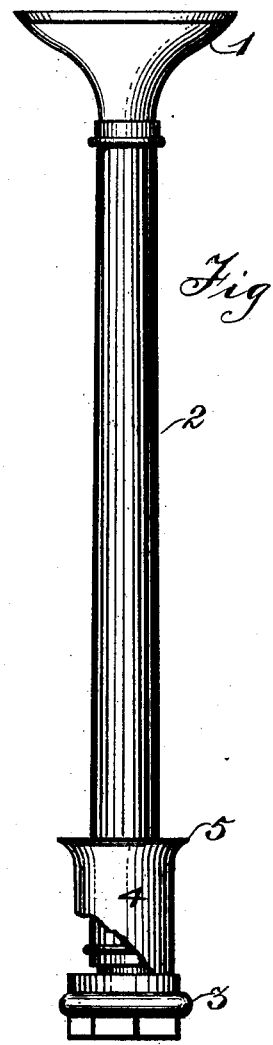
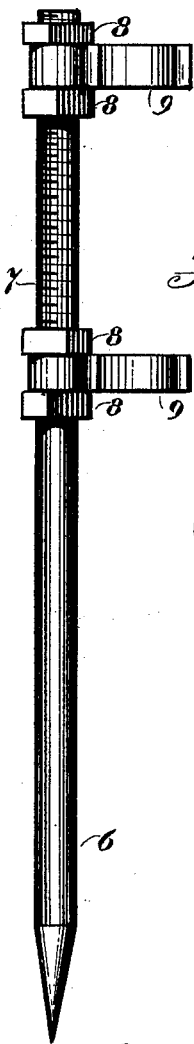
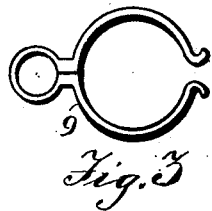

UNITED STATES PATENT OFFICE.

DARIUS W. WELLS, OF OAKLAND, CALIFORNIA.

LAWN-SPRINKLER.

No. 913,791.  Specification of Letters Patent.  Patented March 2, 1909.

Application filed November 5, 1907. Serial No. 400,759.

*To all whom it may concern:*

Be it known that I, DARIUS W. WELLS, a citizen of the United States, residing at Oakland, in the county of Alameda and State of California, have invented a new and useful Improvement in Lawn-Sprinklers, of which the following is a specification in such full and clear terms as will enable those skilled in the art to construct and use the same.

My invention relates to lawn sprinklers and particularly to the type which throws the spray about by varying the position of the rose. Certain of such sprinklers operate by throwing about in various positions the flexible end of a hose terminating in a rose. These sprinklers are affected by the failure of the material out of which the hose is constructed at or near the point joining the moving part to the stationary part.

The object of my invention is to provide a sprinkler of the type referred to which shall perform its functions for an indefinite period without wearing out.

I accomplish my object by the means illustrated in the accompanying drawing of which—

Figure 1 is a view in elevation of my sprinkler showing the attachment for preventing its failure in the manner referred to; Fig. 2 a view in elevation of the means for fixing the sprinkler in any position on a lawn; Fig. 3 a plan view of one of the clips for holding the hose to which my sprinkler is attached.

The same numeral of reference refers to the same part throughout the various views.

The rose 1, is attached to a flexible pipe 2, terminating in a coupling 3. A sleeve 4, loosely encircles said pipe. Sleeve 4, is substantially of the shape shown, having a cup like expansion 5 at its upper edge, along which the pipe 2 may lie at any point without encountering any sharp surfaces. Said sleeve is entirely unattached and may move about the surface of the couplings without obstruction as the pipe 2 sways this way or that way.

6 is a spike, the lower end of which is adapted to be driven into the soil. The upper end is provided with a screw 7, carrying check nuts 8, 8, 8, 8, for securing in adjustable positions the clips 9.

The operation of my device is as follows; The spike 6 is driven into the ground, and the hose arranged in the clips 8, having its end pointing upwards. Coupling 3 is thereupon screwed into the hose coupling and the water is turned on. The force of the water's flow into a flexible, partly obstructed tube, arranged as described, will cause it to sway about under the influence of its own elasticity and the force of gravity, the pivotal point being at the coupling 3, where, if not otherwise provided for, it will break after a short time. But sleeve 4 arranged as aforesaid prevents the pipe from bending too sharply at its pivotal point, and moves its pivotal point away from the inside cutting edge of coupling 3.

I claim:

In a lawn sprinkler, the combination of a stand adapted to be placed on a lawn, a soft rubber tube having a rose sprinkler on one end secured to the stand, and a flared collar of larger diameter than the diameter of the rubber tube resting loosely on the tube support and surrounding the rubber tube.

In testimony whereof I have set my hand this 24th day of October A. D. 1907, in the presence of the two subscribed witnesses.

DARIUS W. WELLS.

Witnesses:
W. T. HESS,
C. P. GRIFFIN.